Figure 4:
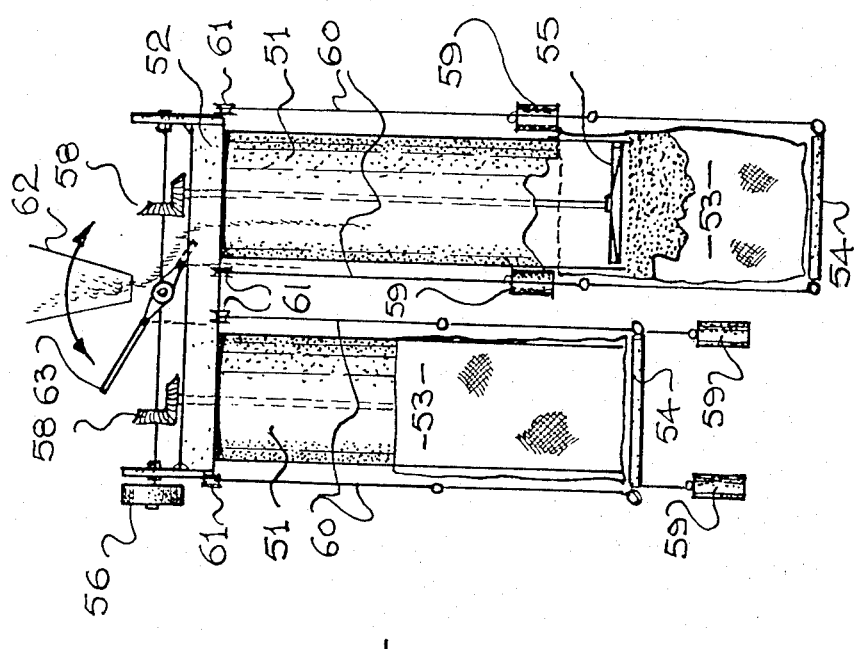

United States Patent [19]

Maher et al.

[11] 4,257,215
[45] Mar. 24, 1981

[54] MOBILE CHAFF-CUTTER

[76] Inventors: Jack Maher, "Shangrilah", N. Condobolin Rd., Forbes, N.S.W., 2871; Grosvenor F. Francis, Berowra, Leadville, Via Dunedoo, N.S.W., 2744, Australia

[21] Appl. No.: 45,876

[22] Filed: Jun. 6, 1979

[51] Int. Cl.³ .................................. A01D 89/00
[52] U.S. Cl. ............................. 56/14.4; 56/14.6; 56/16.4; 56/16.6
[58] Field of Search ..................... 56/14.3–14.6, 56/16.4–16.6, 13.9, 344, 345, 364, DIG. 1, DIG. 2

[56] References Cited

U.S. PATENT DOCUMENTS

| | | | |
|---|---|---|---|
| 1,763,480 | 6/1930 | Rice | 56/16.6 |
| 3,162,003 | 12/1964 | Schapansky | 56/16.5 |
| 3,257,785 | 6/1966 | Rimes | 56/14.5 |
| 3,585,730 | 6/1971 | Morse | 56/13.9 |
| 3,703,802 | 11/1972 | Wrestler et al. | 56/14.6 |
| 3,791,118 | 2/1974 | Behrens | 56/14.5 |
| 3,913,303 | 10/1975 | Blake et al. | 56/14.6 |

*Primary Examiner*—Jay N. Eskovitz
*Attorney, Agent, or Firm*—Stevens, Davis, Miller & Mosher

[57] ABSTRACT

A mobile, self-propelled chaff-production means in which windrowed hay is picked up and conveyed to a chaff-cutter via a covered conveyor. As the hay moves along the conveyor it is moistened by steam applied to it through jets located beneath the input region of the conveyor so that when the hay reaches the chaff-cutter it is moist enough not to be fractured on impact of the blades and cutter bar. The resulting chaff is then conveyed by an auger to a twin-column screw bagger as a final, saleable product.

5 Claims, 4 Drawing Figures

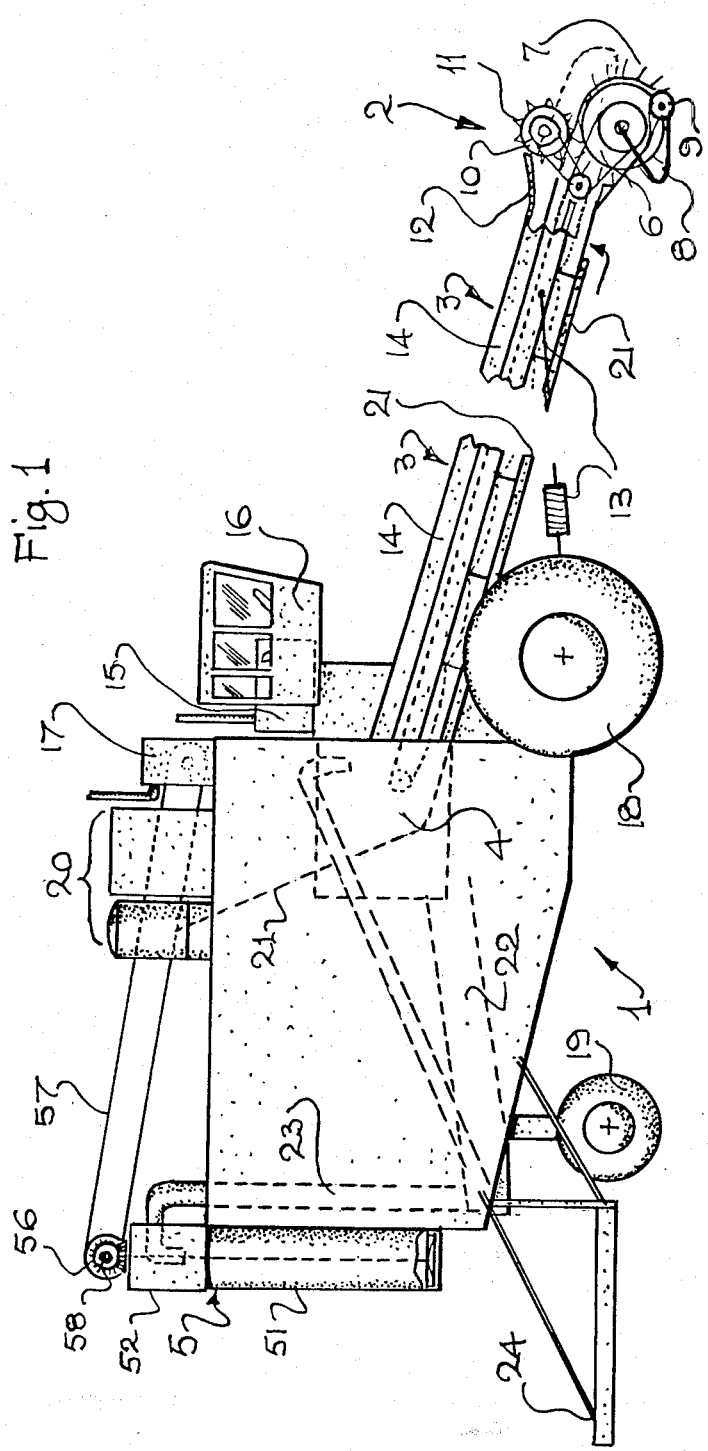

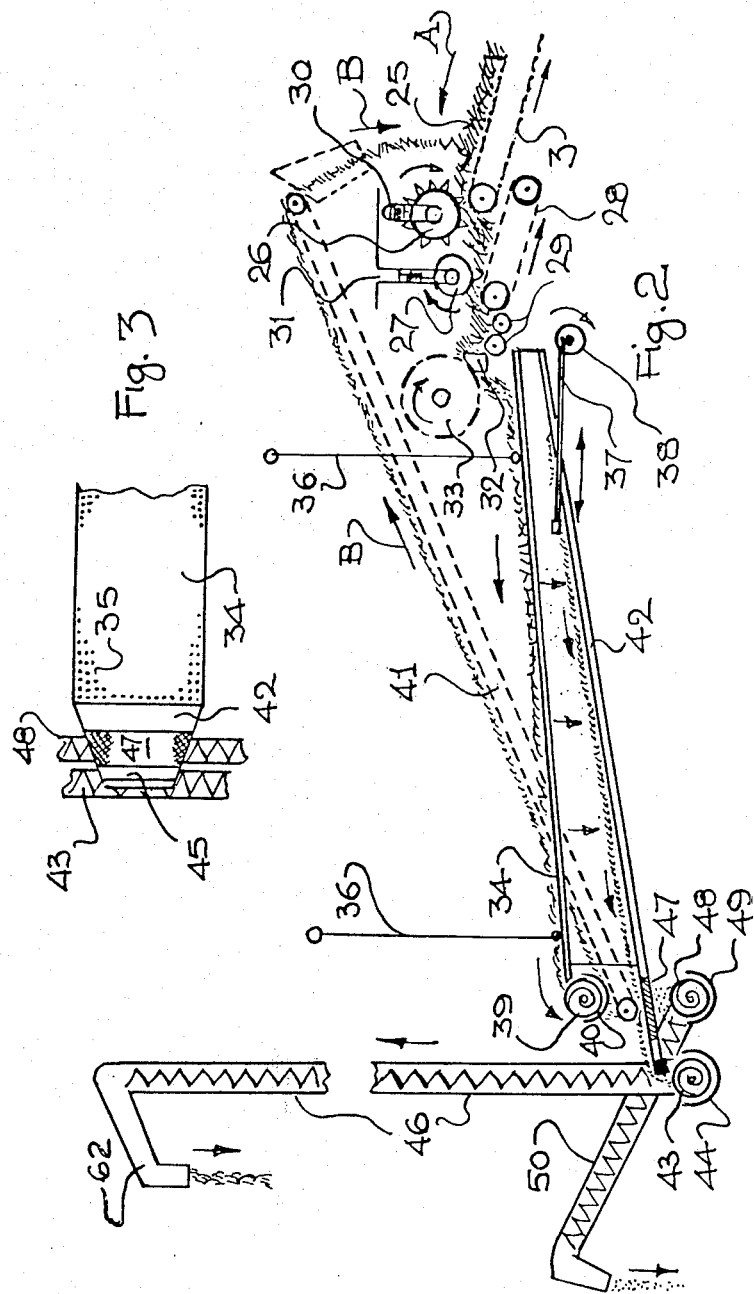

MOBILE CHAFF-CUTTER

This invention relates to agricultural implements and more particularly to a self-propelled, chaff-production apparatus or mechanism.

Hitherto it has been known to manufacture such stock feed products as lucerne chaff by a slow and lengthy process, typically comprising the following sequence of steps:
1. Mowing a standing crop into windrows.
2. Leaving the windrows to 'cure', in fine weather conditions; that is, until the material has the dry appearance and feel which results after its moisture content has been reduced to approximately 17% by weight.
3. Picking up the contents of each windrow progressively, using a baler having a forwardly mounted pick-up in the form of a rake, usually a revolving, driven rake with spring-biased tines: such apparatus normally feeds the material picked up into a chamber of a baling mechanism where it is compressed with a force of about 70 pounds and then tied with twine or wire before the resulting bales are allowed to fall out onto the ground at intervals.
4. Bringing a truck to the lines of bales and picking them up either manually or by means of a mechanical loading device, whence they are conveyed to suitable storage such as a hay barn or a feed mill in the hope that they will be adequately protected from rain, but wherein they are usually not conveniently disposed for subsequent collection.
5. Removing the baling twine or wire and feeding the material to a chaff-cutter; it is generally necessary to tease loose and steam moisten the feed material while it is travelling along a conveyor to the said chaff-cutter. This application of steam is necessary to prevent fracture of the stalk and leaf upon impact, when the latter are bought into contact with the blades of the cutter.
6. Passing the output of the chaff-cutter into suitable bags for transport and use, the said use perhaps taking place up to approximately one year later during an appropriate season.

It is an object of the present invention to eliminate, at least in part, the multiplicity of steps required by the above-described existing process and to provide means for manufacturing lucerne chaff directly from the window.

In accordance with the invention, therefore, in one of its aspects, a mobile chaff-production means comprises, in combination, a self-propelled vehicle having a chassis which supports a hay pick-up, a conveyor, a chaff-cutter, an elevator and a bagger; said hay pick-up being positioned near ground level in communication with a forwardly-directed input region of said conveyor, the output region of which communicates with said chaff-cutter, the downwardly-directed output of the chaff-cutter being adapted to feed the elevator at its lower end, the upper end of the elevator being, in turn adapted to feed the said bagger; whereby the bagger deposits upon the ground or otherwise from the vehicle a continuous succession of bags containing chaff as said vehicle progresses so as to transverse a windrow with the hay pick-up.

It will be seen that chaff, such as lucerne chaff, may be manufactured and bagged at what, in the prior art, was merely the baling site, by a continuous process and thus, in accordance with another aspect of the invention a continuous process for manufacturing chaff at the windrow site comprises the steps of:

picking up hay from a windrow, conveying said picked-up hay to a chaff-cutting station, feeding the resulting chaff to a bagging station, bagging said chaff at said bagging station and discharging bagged chaff from said bagging station.

The mobile chaff-production means broadly described above permits the treatment of hay, such as lucerne hay, having an appropriate moisture content as previously described because an operator of the equipment would be enabled to check the material of the windrow visually or otherwise to ascertain whether curing had reached an appropriate stage. It will be appreciated that any dew which condenses upon a windrow overnight may render the material too moist, whereupon an operator may simply wait until the material is air-dried or sun-dried to a sufficient extent to commence production of chaff as is, of course, done at present. However, with the chaffproduction means and method according to the present invention, some restriction in available working hours—due to having to wait until the material of the windrows is at a suitable stage of cure—is more tolerable than hitherto since the need for the multiple handling above described is for the most part eliminated.

Likewise, an operator of the equipment would cease chaff-production when the material became over-cured, that is to say, too dry, and resulted in its fracturing on impact on entry into the chaff-cutter instead of being cleanly cut by the blades. Such fracture on impact impairs the quality of the product by the inclusion of fractured particles in a 'semi-meal' condition. However, there is preferably provided, on said chassis, a steam generator and associated conduits in communication with a plurality of steam inlet jets positioned adjacent the lower, input region of the conveyor so as to moisten hay being conveyed on the conveyor prior to being cut in the chaff cutter.

In this manner, greater flexibility in the use of the system is achieved since it will not be necessary to restrict working hours due to excessive drying-out of the material of the windrows since this may be compensated for by subsequent moistening on the conveyor.

In order that a better understanding of the invention may be gained, hereinafter is described a preferred embodiment thereof, by way of example only, with reference to the accompanying drawings in which:

FIG. 1—is a side elevational view of the chaff-production means of the present invention, in a simplified style;

FIG. 2—is a schematic illustration showing the mechanisms of FIG. 1 and their interrelated workings;

FIG. 3—is a scrap view looking down on a riddle-plate and tray, and

FIG. 4 is a rear view of a suitable bagger assembly.

FIG. 1 shows, in a simplified manner, the chaff-production means of the present invention. The chassis of the self-propelled vehicle, generally indicated at 1, supports a hay pick-up 2, a conveyor 3, a chaff-cutter 4 and a bagger 5. Hay pick-up 2 includes a reel or cage 6 having thereon a plurality of pick-up tines 7 which are spring-biased to pass through slots in a guard cover 8 which encloses reel 6. A pair of castor wheels, one on either side of reel 6, as indicated at 9 ensure that reel 6 and its guard cover 8 do not come into contact with the ground. Tines 7 pick up hay from a windrow as it is traversed by the vehicle and deliver it to feed roller 10 which is provided with a plurality of axially disposed serrated combs 11. Feed roller 10 feeds the picked-up hay onto conveyor 3. Conveyor 3 should be as short as possible in the interests of maneuverability but nevertheless long enough to permit absorption of moisture. A length of between 12 and 15 feet is suitable for the fulfilment of these conditions. Conveyor 3 has an entrance chute 12 of the order of about 20 inches in width while reel 6 is in the order of 3 to 4 feet wide. Guide plates are provided in known manner to channel hay picked up by tines 7 of reel 6 into the much narrower entrance chute 12 of conveyor 3. Conveyor 3 is connected to a hydraulic lift arrangement 13 under the control of the driver and adapted to enable hay pick-up assembly 2 to clear any uneven ground during progress of the vehicle which is adapted to move forward over the ground at approximately a walking pace. Conveyor 3 is a single-chain conveyor for preference and is enclosed by a hood 14 for the purpose of retaining steam when the conveyed hay requires to be moisturized prior to cutting into chaff. Hay pick-up 2, conveyor 3 and feed roller 10 are driven through belts or chains by a secondary mover 15 located alongside a driver's cab 16. Behind cab 16 there is positioned a prime mover 17 which powers the hydraulic arrangement 13 and provides the means for propelling the vehicle itself. The chassis of the vehicle 1 may have a wheelbase of about 15 feet, the diameter of its front wheels 18 being approximately 5 feet and that of its rear wheels 19 about 2 feet 6 inches. The rear wheel track may be approximately 4 feet and the front wheel track about 6 feet. Front wheels 18 or the rear wheels 19 or, if desired, all the wheels may be driven by prime mover 17 and all said wheels shod with such as tractor tires. Preferably, rear wheel hydraulic steering, again powered by prime mover 17, is used to assist maneuverability.

Behind cab 16 a suitable steam generator 20 may be mounted, which has associated steam conduit 21 for the purpose of supplying steam to conveyor 3 to enable the hay to be moisturized as it travels up the conveyor. Steam conduit 21 is connected to a V-shaped manifold mounted upon the undersurface of the deck of conveyor 3. This V-shaped manifold spans the width of the conveyor 3 and its apex is arranged to point downstream, that is, to the rear of the vehicle. This manifold has a number of steam inlet jets in the form of apertures along its two limbs and these apertures are aligned to correspond with a like number of holes in the conveyor deck. It is desirable that the manifold should be mounted adjacent the input region of conveyor 3.

To the rear of chaff-cutter 4 a riddle 22 is provided to separate long, that is, oversized, particles of chaff from material which is ready to be collected by an elevator 23 which raises the chaff to feed bagger 5.

Cantilevered from the rear of vehicle 1 is a platform 24 upon which an operator may stand during the bagging operation. Turning now to FIG. 2, hay 25 picked up by the pick-up assembly 2 (not shown in FIG. 2) travels in the direction indicated by arrow A until it contracts a serrated feed roller 26, of similar construction to feed roller 10 of pick-up 2 (see FIG. 1). Hay 25 passes beneath a pressure roller 27 which presses it against a short, slatted belt conveyor 28 which in turn feeds the hay over a pair of auxiliary rolls 29. Rollers 26 and 27 are journalled within slots 30, 31 in the sidewalls of the chaff-cutter assembly and spring-loaded to enable pressure on the fed hay to be varied according to need.

From rolls 29 the hay 25 passes across the cutter bar 32 of a reel-type heavy-duty chaff-cutter 33.

Chaff-cutter 33 may have six angled blades arranged in a manner generally similar to that of a reel or cylinder type lawn mower and should be of the self-sharpening kind. Cutter bar 32 is ideally fabricated from case-hardened steel. Chaff cut between cutter bar 32 and the blades of chaff-cutter 33 is allowed to fall by gravity onto a riddle-plate 34 which has a multiplicity of apertures 35 therein (see FIG. 3). Riddle-plate 34 is suspended on a number of hangers 36 and is caused to oscillate longitudinally by means of a rod 37 attached to it and coupled eccentrically to a wheel 38 so as to have a 'throw' of about 4 inches. Apertures 35 in riddle-plate 34 are of conical form with their larger mouths opening upwards. Oversized particles of chaff remain on riddle-plate 34 and gradually move towards the rear of the vehicle until they fall onto transversely-disposed auger 39 rotating in a trough 40 (Auger 39 and its trough 40 are not shown in FIG. 3). Auger 39 conveys the oversized chaff particles onto the input end of an enclosed slatted recycling conveyor 41 which feeds them back, in the direction indicated by arrows B, to chaff-cutter 4 to be cut to usable size for return to the riddle.

Attached beneath riddle-plate 34 and oscillating with it is a tray 42 to collect correctly-sized particles of chaff falling through apertures 35 of riddle-plate 34. These particles also gradually move rearwardly until they fall over the tapered rear lip of tray 42 onto a second transversely-disposed auger 43 rotating in a trough 44. The tapered lip of tray 42 is provided with a permanent bar-magnet 45 to remove such detritus as pieces of wire and the like from the chaff. Auger 43 delivers the chaff to a substantially vertical elevator 46 in the form of an auger which lifts the chaff and delivers it to the bagger 5 at the rear of the vehicle through spout 62.

The lip portion of tray 42 may also be provided with a foraminous region 47 through which hay-dust may fall to be collected by a third transverse auger 48 rotating in a trough 49 which auger 48 delivers the dust to a further auger or elevator 50 from whence it can be bagged either on the bagging platform 24 or to one side of the vehicle. Such haydust, if not removed, can cause clogging of machinery and in addition has some economic value as a poultry feed.

Rollers 26 and 27, rolls 29 and cutter 33 may be belt or chain driven from secondary mover 15, while the riddle assembly, conveyor 41, augers 39, 43, 46, 48 and 50, and bagger 5 may be powered by prime mover 17.

FIG. 4 illustrates a bagger suitable for use in the present invention. The bagger is mounted at the rear of the vehicle as shown in FIG. 1 and comprises two open-ended columns or cylinders 51 depending from a framework 52. Cylinders 51 are of such a diameter as to fit into the mouth of a standard chaff-bag 53. Each cylinder 51 is provided with a chain 54 upon which chaff-bags are supported for filling. Each cylinder 51 has within it a bagging-screw 55 which, when rotated, compresses the contents of the bag being filled. Bagging-screws 55 are powered by prime mover 17 via pulley 56 and belt 57 (see FIG. 1), and bevel gear-sets 58. The weight of chairs 54 and the supported bags of chaff are balanced by means of counterweights 59 and the weight of chaff packed into each bag 53 may be controlled by a band-brake (not shown) which prevents freedom of movement of the cables 60 over their associated sheaves or pulleys or blocks 61.

Chaff may be selectively fed from the spout 62 of elevator 46 (see FIG. 2) into either of the cylinders 51 by manually operating a butterfly-type valve 63 which directs the flow of chaff into one or another of the cylinders 51 according to requirements.

It will be realized from the foregoing that the present invention is not merely a harvesting device and process but a manufacturing plant and process for stock feeds and while it has been described above with particular reference to a lucerne crop it nevertheless applies generally to fodder crops of legume and cereal nature. The invention also eliminates much of the multiple handling formerly required and additionally the cost of the relatively expensive baling wire or twine or the equivalent thereof and moreover obviates the tedious and expensive task of carting bales to shed, barn or mill.

Furthermore, the invention overcomes the risk of the accidental chopping up of pieces of wire and the like, which may become mixed with the chaff in a dangerous manner, having regard to the uses to which the said chaff is usually put, namely as fodder for such livestock as racehorses, stud animals and the like.

The claims defining the invention are as follows:

We claim:

1. A mobile chaff-production means comprising, in combination, a self-propelled wheeled vehicle having a chassis which supports:
   a hay pick-up reel;
   a covered conveyor;
   a chaff-cutting device;
   a vertically-disposed auger;
   a twin-column screw bagger; and
   a steam generator and associated conduits in communication with a plurality of steam inlet jets disposed in a V-shaped manifold with the apex thereof pointing downstream and positioned adjacent the input region of said covered conveyor, said manifold being mounted upon the underside of the deck of said covered conveyor, which is provided with corresponding apertures therein;
   said hay pick-up reel being positioned near ground level in communication with said covered conveyor input region, the output region of which communicates with said chaff-cutting device, the downwardly-directed output of said chaff-cutting device feeding said vertically-disposed auger at its lower end, the upper end of said vertically-disposed auger, in turn, feeding said twin-column screw bagger.

2. The mobile chaff-production means as claimed in claim 1, wherein an oscillatable riddle-plate is provided to intercept said downwardlydirected output of said chaff-cutter whereby oversized pieces of material are separated from material ready for bagging, which latter material passes through apertures in said riddle-plate into a try therebeneath for delivery to said bagger via said elevator.

3. The mobile chaff-production means as claimed in claim 2, wherein a first transversely-disposed auger located adjacent the output end of said riddle-plate feeds said oversized material to the input end of a recycling conveyor, the output end of which is in communication with said chaff-cutter.

4. The mobile chaff-production means as claimed in claim 2 or claim 3, wherein a second transversely-disposed auger located adjacent the output end of said tray feeds said vertically-disposed auger.

5. The mobile chaff-production means as claimed in any one of claims 2 to 4, wherein said tray has a foraminous region towards its output end in communication with a third transversely-disposed auger, whereby hay-dust falling through said foraminous region is removed for bagging at said secondary bagging station.

* * * * *